under Aug. 29, 1961

2,998,411
MELAMINE-FORMALDEHYDE REACTION PRODUCTS AND PROCESS OF PREPARING THE SAME

Richard N. Housekeeper, Pittsburgh, Pa., assignor to American Cyanamid Company, New York, N.Y., a corporation of Maine
No Drawing. Filed Mar. 17, 1958, Ser. No. 721,692
5 Claims. (Cl. 260—67.6)

This invention relates to a method of preparing a melamine-formaldehyde reaction product and to the product thus produced. More particularly, this invention relates to a highly methylolated melamine-formaldehyde reaction product and to the product thus produced. Still further, this invention relates to the method of preparing highly alkylated, highly methylolated melamine-formaldehyde reaction products and to the products thus produced.

One of the objects of the present invention is to produce a highly methylolated melamine-formaldehyde reaction product. A further object of the present invention is to produce a highly etherified, highly methylolated melamine-formaldehyde reaction product. A further object of the present invention is to produce a resinous composition comprising an oil-modified alkyd resin blended with a highly etherified, highly methylolated melamine-formaldehyde reaction product. These and other objects of the present invention will be discussed in greater detail hereinbelow.

In the practice of the process of the present invention, there are three fundamental steps. These steps are identified as:
1. Dissolution
2. Methylolation
3. Alkylation

DISSOLUTION

In the dissolution step, melamine is dissolved in a non-alcoholic aqueous solution of formaldehyde at a pH between about 7 and 11 at temperatures inversely varying between about 75° C. and 35° C. Preferably, one would use a pH varying between about 7.75 and 8.0 at temperatures varying inversely between 65° C. and 55° C. By inverse variation of temperature with pH is meant that if the dissolution is carried out at a pH of 7, the temperature is advantageously maintained at about 75° C. whereas if the dissolution is carried out at a pH of 11, the temperature is advantageously maintained at about 35° C. The mol ratio of the formaldehyde to melamine should be at least 6.5:1, respectively, and preferably at least about 10:1, formaldehyde to melamine, respectively. Higher mol ratios of formaldehyde to melamine may be utilized in an endeavor to achieve full methylolation such as mol ratios of 15:1, 20:1, 30:1 or even higher. Any excess formaldehyde charged in the dissolution step can be readily recovered at a later part of the process and recycled in subsequent reactions. While dissolving the melamine in the non-alcoholic aqueous solution of formaldehyde, stirring of the potential reactants should be observed. This stirring may be either violent enough to cause turbulence or it may be gentle enough so as to avoid agitation. The aqueous solution of formaldehyde used in the course of the dissolution step should be substantially non-alcoholic. Commercially available formalin (an aqueous solution of formaldehyde) frequently contains small percentages of methanol. These small percentages of methanol are tolerable in the process of the present invention although it is preferred for optimum operating conditions that the aqueous solution of formaldehyde be free of methanol and other alcoholic-type materials. Because of the effect which methanol has on the reaction between formaldehyde and melamine, added quantities of methanol over and beyond those small amounts sometimes normally found in commercial formalin must be avoided. The effect that the methanol has on the melamine-formaldehyde reaction is to inhibit the formation of fully methylolated melamine-formaldehyde reaction products. This is true even when the amount of formaldehyde present is stoichiometrically sufficient to provide full and complete methylolation of the melamine. The presence of significant amounts of methanol tends to set up a reversible type of reaction between the formaldehyde and the melamine thus causing a demethylolation reaction to take place simultaneously with a methylolation reaction in which the ultimate product never achieves full methylolation. The partially methylolated melamine is soluble in water whereas the fully methylolated melamine is substantially water-insoluble. If the reaction medium contains a significant amount of alcohol, such as methanol, the partially methylolated melamine can precipitate from such an aqueous alcohol solution. Once the partially methylolated melamine precipitates from the aqueous alcohol solution, further methylolation to full methylolation is prevented. During the dissolution, the amount of water present may be varied over a substantially large range. At the outset, it is only necessary that there be a sufficient amount of water to provide a solvent for the melamine going into solution. Larger amounts may be used such as 30%, 40%, 50%, 60%, or 70% by weight based on the total weight of water and reactants. If amounts less than 70% are used initially, the total water content should be adjusted as the melamine becomes dissolved either immediately as the melamine is being added or at some time prior to complete dissolution or upon complete dissolution of the melamine in the water to a water content of at least 60% by weight based on the total weight of water and the reactants. At any rate, the total water content must be adjusted prior to the methylolation step to at least 60% by weight for best product and yield.

METHYLOLATION

The methylolation step is the most critical part of the overall process of the present invention. Any pH between 7 and 11 may be utilized with an inversely corresponding temperature control between 75° C. and 35° C. This appears to be a more relaxed control than the comparable limitations observed in the dissolution step. However, during the methylolation step, the mixing must be slowed down from the dissolution step if vigorous agitation had been observed in that earlier step because during the methylolation step, the mixing must be gentle so as to provide stirring without agitation wherein agitation would be sufficient to cause turbulence in the fluid. On the other hand, no mixing at all would be intolerable. Stirring the reactants without agitation permits the water-soluble methylol melamines in solution to remain in contact with the formaldehyde available for reaction so as to provide adequate opportunity to transcend the barrier from partial methylolation to complete and full methylolation. Since the partially methylolated melamine is water-soluble and the fully methylolated melamine is substantially water-insoluble, there is a time lag between the time that the melamine per se first dissolves in the aqueous solution and the time when the first precipitate of fully methylolated melamine appears. Beyond this point when the first precipitate appears, the stirring must be diminished to a gentle mixing without agitation. As a consequence, on complete dissolution of the melamine, the agitation may be maintained in a turbulent state if desired until the first precipitate appears. Thereafter, the agitation must be gentle and without turbulence because the strong agitation with turbulence reduces the aggregates of the fully methylolated melamine crystals to exceedingly fine crystals which are practically unfilterable. The correlation between the pH and the temperature during this gentle mixing of the reactants must be carefully watched. The reaction between melamine and formaldehyde is exothermic. When the reaction is at least partially completed, the exotherm begins to subside. This will be noted by the decline in temperature observed when the exotherm has passed its peak. As a consequence, during the methylolation step, upon the observation of exotherm subsidence, the pH is raised to 8–11 in order to inhibit the temperature decline due to exotherm subsidence and to achieve maximum yield. By raising the pH, no externally applied heat is necessary, the temperature remains substantially constant and with the gentle mixing without turbulence the partially methylolated melamine-formaldehyde reaction product is held in the reaction sphere full methylolation is achieved. The fully methylolated melamine-formaldehyde reaction product will form as substantially large crystalline aggregates which can readily be separated in a substantially 100% yield from the supernatant liquid comprising water and formaldehyde. Another important reason for the gentle stirring of the reactants resides in the fact that if agitation with turbulence is practiced, the fully methylolated melamine-formaldehyde reaction product will precipitate out of suspension as finely divided particles which are separated from the supernatant liquid with the greatest of difficulty because of the filtration problem that these very fine particles present. By the practice of the process of the present invention, the instant methylolation step produces fully methylolated melamine-formaldehyde reaction products which are comparatively substantial in size and as a consequence, can be readily separated from the supernatant liquid by a conventional filtering procedure. Even decantation could be used but more of the free water is removed by filtration with no loss of product.

The precise identity of the instant product is not known beyond the fact that it is a fully methylolated melamine-formaldehyde reaction product. Theoretically, it is not possible to react more than 6 mols of formaldehyde as a maximum with a mol of melamine. However, when the product of the present invention is compared with "hexamethylol melamine" of the prior art prepared according to prior art processes, there is a substantial difference. Whether this can be explained on the basis of some intricate intramolecular rearrangement wherein more of the ring nitrogen atoms becomes methylolated is not fully known or understood, but the fact remains that the instant product is so substantially different from the prior art products identified as "hexamethylol melamine" as to force one to conclude that there is in fact an essential difference between the two.

ALKYLATION

If it is desired to alkylate the fully methylolated melamine-formaldehyde reaction product of the instant invention, one may do so by reacting said fully methylolated melamine-formaldehyde reaction product with a monohydric aliphatic alcohol containing from 1 to 4 carbon atoms such as methanol, ethanol, propanol, isopropanol, n-butanol, secondary butanol, and tertiary butanol. For the purposes of the present invention, methanol is preferred. There are a number of approaches to the alkylation of the melamine-formaldehyde reaction product of the present invention. By alkylation, it is meant the reaction of an alcohol with a methylol melamine. In view of the ether linkage developed in the course of the alkylation reaction, this type of procedure is frequently referred to as an etherification reaction and the ultimate product is referred to as an ether of a methylol melamine. Although the fully methylolated melamine-formaldehyde reaction product may be only partially etherified, it is preferred that said melamine-formaldehyde reaction product be as fully etherified as possible. If one wishes to methylate the fully methylolated melamine-formaldehyde reaction product in a one-step reaction, it is considered desirable to remove additional water from the filtered product produced hereinabove. The filtered product referred to has the appearance of a dry solid, but analytical tests clearly indicate the presence of free water. Such a water-containing product must be dehydrated to a water content between about 8 and 20% if the alkylation step is to be accomplished in a single step reaction. This dehydration step before alkylation has been found to be time consuming and somewhat cumbersome and as a consequence, it is preferred from an operability standpoint to make use of a double methylation operation. All that is said hereinabove with respect to methylation is equally applicable to ethylation, propylation and butylation. In order that this specific refinement of the present invention may be more fully understood, further details relating to this double methylation step are set forth hereinbelow.

First alkylation step

The filtered melamine-formaldehyde reaction product produced in the methylolation step and without a dehydration step is blended with an alcohol such as methanol wherein the methanol is present in an amount of at least 8 mols for each mol of melamine calculated to be present in the melamine-formaldehyde reaction product. During the methylation step, mixing must be observed but the type of mixing is not critical as it was in the methylolation step. As a consequence, the mixing may be either mild or turbulent. The temperature should be controlled between about 20° C. and 75° C. The pH must be adjusted to about 1–3 and preferably about 2. There is no critical interrelationship between temperature and pH in the alkylation step as there was in the methylolation step. It should be recognized, however, that at the lower temperature, namely, 20° C., and the higher pH, namely 3, the reaction will not proceed as rapidly as it will when the temperature is at 75° C. and the pH is 1. The first alkylation step is carried out until substantially all of the solids have been dissolved in the methanol. At this point, the solution is neutralized by adjusting the pH to about 7–11. Upon neutralization, the partially methylated product is then dehydrated to remove at least 80% of the free water. Some of this removed water was free water before the alkylation step was undertaken whereas other quantities of this water were developed during the alkylation as a result of condensation in the ether formation. In order to dehydrate the resulting product, it is preferred to use vacuum distillation using a vacuum up to about 26 inches of mercury. In the course of this vacuum distillation, it is not only possible but desirable to add an organic solvent, preferably one which is immiscible with water such as xylene, and to continue the vacuum distillation. When the water content is reduced to less than 20% by calculation, the product is ready for the second alkylation step.

Second alkylation step

The product produced in the first alkylation step is blended with an additional charge of the same monohydric alcohol such as methanol wherein the methanol is charged in a quantity of at least 3 mols per mol of melamine calculated to be in the charged melamine-formaldehyde product. It is preferred that the methanol be charged in a mol ratio of 14:1 or higher. Even mol ratios of 20:1, 30:1 and the like, methanol to calculated melamine, may be used in the second alkylation step or even in the first alkylation step inasmuch as the excess methanol can be recycled in subsequent alkylation steps and as a consequence, is not lost or wasted. As in the first alkylation step, the temperature is controlled between about 20 and 75° C. and preferably between about 35 and 55° C. at a pH between 1 and 3, preferably 2. The second alkylation step is carried out with agitation either mild, i.e., without turbulence, or vigorous agitation and preferably the latter. The time of reaction in the second alkylation step will vary between about 10 minutes to 3 hours depending on the pH and temperature selected. On completion of the second alkylation reaction, the charge is neutralized to a pH of about 7–11 and vacuum distillation is applied to the system until no additional water comes off. The resultant solids may be diluted at will with appropriate organic solvents in preparation for use in coating compositions if such is desired.

Notwithstanding the detailed discussions of the process of the present invention set forth hereinabove, it is considered desirable to illustrate the concept of the present invention by use of specific examples which are set forth hereinbelow. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with thermometer, stirrer and reflux condenser, there is introduced 910 parts of an aqueous solution of formaldehyde (7 mols) with the pH adjusted to about 7.5 by use of sodium bicarbonate. The formaldehyde solution is heated gradually to about 60° C. whereupon there is added 126 parts of melamine in a 15-minute period with constant vigorous agitation. When the melamine has completely dissolved, as shown by a clear solution, the agitation is reduced to a gentle stirring without turbulence. The pH is gradually increased from 7.5 to about 9 over a two-hour period. In each instance, a raise in pH is accomplished when the exotherm appears to be undergoing subsidence as indicated by a tendency for the temperature to drop. By raising the pH gradually, the temperature is held substantially constant at 60° C. The solid reaction product begins to precipitate out of solution within the first one-half hour after a pH slightly above 8.0 is obtained and continues until substantially all of the solids have been precipitated out of solution at the pH of 9. With constant gentle stirring, the charge is held for an additional three hours at 60° C. and a pH of 9. Toward the latter part of this period, no additional solid material precipitates and the charge is then filtered to remove the supernatant liquid and to recover the solid melamine-formaldehyde product.

EXAMPLE 2

To the product of Example 1 in a wet filter cake, there is added 575 parts of methanol while cooling to about 30° C. The pH of the system is adjusted to 2 with 60° Bé. sulfuric acid. The charge is held with constant agitation at 30° C. until the solid precipitate has dissolved whereupon the pH is adjusted to 7.0 with sodium bicarbonate. The system is subjected to vacuum distillation to remove the unreacted methanol, formaldehyde and water. A charge of xylol is added and the system is again placed under a vacuum still to azeotrope the last traces of water at a vacuum of 26 inches of mercury at a temperature of 75° C. The vacuum is removed and there is added 575 parts of methanol while cooling again to 30° C. The pH is again adjusted to about 2 with 60° Bé. sulfuric acid and held at 30° C. for about 45 minutes. The pH is then adjusted to 7 with sodium bicarbonate and the system is subjected to a vacuum distillation to remove the volatiles. The product is then dried by azeotroping with xylol to 100° C. The waxy product thus produced is cut in a suitable solvent such as xylol and/or butanol to a desired solids content.

EXAMPLE 3

Into a suitable reaction vessel equipped with thermometer, stirrer and reflux condenser, there is introduced 270 parts of formaldehyde dissolved in 510 parts of water. The pH is adjusted to 8.5 by the use of sodium hydroxide whereupon 126 parts of melamine are added over a period of about two hours while holding the temperature at about 50° C. The charge is held at 50° C. for about three hours after the melamine addition is completed. The agitator speed is diminished to a mild stirring without turbulence. As a solid material begins to precipitate out and the exotherm begins to diminish, the temperature is held substantially at 50° C. while the pH is raised to about 9.5. When the addition of more alkaline material to raise the pH causes no exotherm and causes no additional solids to precipitate, the charge is filtered and the solid material recovered as coarse aggregates.

EXAMPLE 4

The wet solids material from Example 3 is charged into a suitable reaction vessel equipped as before and there is added thereto 480 parts of methanol while cooling the system to about 35° C. The pH of the system is adjusted to 3.0 by the addition of 60° Bé. sulfuric acid. The charge is mixed with some agitation until the precipitate is completely dissolved whereupon the pH is adjusted to 9.0 with sodium hydroxide. A vacuum distillation is carried out until substantially all of the unreacted methanol, formaldehyde and other volatiles are removed. The last traces of water are removed by vacuum azeotroping with toluene. The vacuum is then removed and there is added 480 additional parts of methanol while cooling to 35° C. The pH is then adjusted to 3.0 with 60° Bé. sulfuric acid and the charge is held at 35° C. for about three hours. The pH is then adjusted to 9.0 with sodium hydroxide and is then vacuum distilled to remove the volatiles. The product is dried by azeotroping with toluene at 90° C. and the resultant resinous material may be cut in a solvent of choice such as toluene and/or butanol.

EXAMPLE 5

Into a suitable reaction vessel equipped as before, there is introduced 544 parts of water containing 330 parts of formaldehyde. The charge is heated gradually to about 50° C., adjusting the pH to about 8.0 with 20% sodium hydroxide. Heating is continued and at 70° C., 126 parts of melamine are added over a period of about two hours with constant agitation. After the melamine addition is completed, the charge is held at 70° C. for about one hour whereupon the solution clears indicating that all of the melamine has been dissolved. The agitator speed is then slowed down to a gentle stirring without turbulence and the precipitated solids begin to settle out. As before, when the exotherm begins to subside, the pH is raised gradually while continuing to observe the slow gentle stirring until no further solid material precipitates from solution. Thereupon, the supernatant liquid is decanted.

EXAMPLE 6

To the wet cake produced according to Example 5, there is added 288 parts of methanol while cooling the system to about 45° C. The pH is adjusted to about 2.5 with 95% sulfuric acid and the charge is held at about 45° C. until the precipitate is substantially completely dissolved whereupon the pH is adjusted to 11 with a 20% sodium hydroxide solution. Vacuum distillation then removes all of the volatiles while the last traces of water are removed by vacuum azeotroping with xylol. The vacuum is then removed and there is added 288 additional parts of methanol while cooling to about 45° C. The pH is then readjusted to about 2.5 with 95% sulfuric acid and the charge is held at 45° C. for about three hours whereupon the pH is adjusted to 11 with 20% sodium hydroxide and the volatiles are distilled out under vacuum. By azeotroping the product with xylol to 100° C., a substantially water free product is produced. The resultant resinous material may be cut with a solvent of choice to a given desired solids content.

The alkylated methylol melamines of the present invention are not fully or infinitely water soluble at room temperature and it has been noted that the degree of solubility of a product decreases as the temperature increases. As an example of this, a saturated solution of water and fully methylated methylol melamine, representative of the product made according to the present invention at 25° C. contained about 33% of the methylated product and about 67% of water. A saturated solution of the mixture of these components at 60° C. contained about 16% of the methylated product and about 84% of water.

The alkylated methylol melamines produced according to the present invention when in the liquid form are clear water-white solutions having a Gardner-Holdt viscosity at 25° C. of less than A, a solids content of between 55 and 65%, a xylene tolerance of infinity, a mineral spirits tolerance of greater than 50 pounds of spirits per 100 pounds of resin solution, and an acid number of less than 1 when determined on a solid basis.

The alkylated methylol melamines of this invention are compatible with a wide variety of alkyd resins, and improve their surface coating properties, both when used alone therewith and when used in combination with other commercially available amino resins.

The amino resin of the present invention may be successfully used with the oil-free, or oil-containing alkyds, the latter group being classified as short, medium, and long oil resins.

The oil-containing alkyds, generally speaking, are made from three reactants: (1) a polycarboxylic acid free from non-benzenoid unsaturation or its anhydride, (2) polyhydric alcohol, and (3) a glyceride oil, either non-drying, semi-drying, drying or the fatty acids derived therefrom or their monoglycerides.

Said polycarboxylic acid is present in preponderant amounts, sometimes to the complete exclusion of any unsaturated polycarboxylic acids, such as those that are not free from any non-benzenoid saturation. The alpha-beta ethylenically unsaturated polycarboxylic acids may be used in relatively small amounts, generally in amounts not exceeding about 10% by weight based on the total weight of polycarboxylic acids used.

Among the polycarboxylic acids free of non-benzenoid unsaturation that may be used are phthalic, oxalic, malonic, succinic, glutaric, sebacic, adipic, pimelic, suberic, azelaic, tricarballylic, citric, tartaric, malic, and the like. Whenever available, the anhydrides may be used. Furthermore, mixtures of these acids and/or their anhydrides may be used.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, alkane diols, propylene glycol, dipropylene glycol and the like. These polyhydric alcohols may be used alone or in admixture with each other.

Oils suitable for use in formulating oil-containing alkyds include coconut oil, cottonseed, soybean, linseed, perilla, caster, babassu, murumuru, tallow-beef, mustard seed, rape seed, peanut, sesame, sunflower, walnut, tongue, oiticia, whale, menhaden, sardine, and the like. These oils may be used alone or in admixture with each other.

Good surface coatings for specific purposes may be obtained where the amino resin of the present invention in a 100-part mixture with an alkyd constitutes between 1 and 80 parts thereof, although such mixtures containing between 3 and 40 parts are preferred.

Table 1 below illustrates the compatibility of the amino resin made according to the present invention with various commercial alkyd resins and in varied amounts. Resin A therein is a resin made according to the process set forth in Example 2 supra, which has been cut in a 50:50 xylene n-butanol mixture. Resin B is a 1:1 mixture of resin A and a commercially available amino resin, hereinafter call resin C which is essentially pentamethylol melamine which has been alkylated with from 2 to 3 mols of butanol and which is cut in a 45:55 xylene to butanol solvent mixture. Since resin A is cut in a 50:50 xylene butanol mixture, resin B which is a mixture of resins A and C is cut in a 47:53 xylene butanol solvent mixture. Resins A, B and C each contain, as a catalyst, 1% p-toluene sulfonic acid based on the total amino solids.

It should be understood that while these amino resins are cut in xylene-butanol solvent mixtures, for many purposes all xylene or other hydrocarbon solvents are preferred, as where the odor of butanol is objectionable. In addition, these solvent ratios are illustrative, and may be varied over wide ranges as is well known in the art.

Resin D referred to therein is a short oil alkyd resin which is principally the reaction product of phthalic anhydride, ethylene glycol, pentaerythritol and tall oil fatty acids. Resin E is a medium oil alkyd, the reaction product of phthalic anhydride, soya bean oil, and a monoglyceride; resin F is also a medium oil alkyd, the reaction product of phthalic anhydride, soya fatty acid, and glycerin. Resin G is a medium oil phthalic anhydride, soya fatty acid, glycerin reaction product, which has been coreacted with styrene.

For purposes of determining the compatibility of the amino resin of the present invention, it was mixed in graduated amounts with resins D–G and observed, coated on glass surfaces, air dried for 30 minutes, and observed, and then baked on the said surfaces for 10 minutes at 300° F. and observed.

*Table 1*

COMPATIBILITY WITH ALKYD RESINS

|  | Resin A | | | Resin B | | | Resin C | | |
| --- | --- | --- | --- | --- | --- | --- | --- | --- | --- |
|  | Mix | Air | Bake | M | A | B | M | A | B |
| Resin D+: | | | | | | | | | |
| 10% amino | C | C | C | C | C | C | C | C | C |
| 30% | C | C | C | C | C | C | C | C | BH |
| 50% | C | C | C | C | C | C | C | C | H |
| Resin E+: | | | | | | | | | |
| 10% amino | C | C | C | C | C | C | C | C | C |
| 30% | C | C | C | C | C | C | C | BH | C |
| 50% | C | C | C | C | C | C | C | BH | H |
| Resin F+: | | | | | | | | | |
| 10% amino | C | C | C | C | C | C | C | H | BH |
| 30% | C | C | C | C | C | C | C | Cl | BH |
| 50% | C | C | C | C | BH | C | C | Cl | Cl |
| Resin G+: | | | | | | | | | |
| 10% amino | C | C | C | C | C | C | C | BH | BH |
| 30% | C | C | C | C | C | C | H | BH | Cl |
| 50% | C | C | C | C | C | C | Cl | Cl | Cl |

Code: C=clear; BH=bluish haze; H=hazy; Cl=cloudy.

A study of the table indicates that the resin produced according to the present invention (resin A) is compatible with a wide variety of alkyds, and is superior in compatibility therewith than commercially available amino resin C. In addition, it should be noted that resin B which is a 1:1 mixture of resins A and C is substantially equal to resin A in compatibility. This obviously is the result of resin A being present in the mixture.

Table 2 is an evaluation of films of white baking enamels which have been placed on steel by a 0.003 mol Bird doctor blade and baked 30 minutes at 300° F. The pigment/binder (P/B) ratio of the enamels is 100:100, the pigment being titanium dioxide. The resin ratio of the binder is 80:20 and consists of 80 parts of a short oil alkyd (hereinafter referred to as resin H) which is essentially the reaction product of phthalic anhydride, soya fatty acids and glycerin, and 20 parts of amino resin. Each of the resin binders contains, as a catalyst, 1% p-toluene sulfonic acid based on the weight of the total amino solids. In addition, the total solvent ratio of the enamel has been adjusted to 80:20 xylene/butanol.

Table 2
WHITE ENAMEL EVALUATION

| Resin, 30' at 300° F. | H/A 80/20 | H/A/C 80:10:10 | H/C 80:20 |
|---|---|---|---|
| Steel: | | | |
| Color | 90 | 89 | 85 |
| Gloss Vis. | 90 | 95 | 85 |
| Gloss [1] 60° | 90 | 98 | 84 |
| Sward | 58 | 56 | 46 |
| Mar Res. | 90 | 80 | 70 |
| Xylene [2] | 100 | 50 | 0 |
| Acetic Acid,[3] 50% | 100 | 50 | 0 |
| NaOH,[4] 10% | 100 | 98 | 10 |

[1] Gardner portable 60° glass meter.
[2] Rating at 20'.
[3] Rating at 1 hour.
[4] Rating at 3 hours.

In the above chart:
A—100 is theoretically perfect for color, gloss vis., gloss 60° and mar res.
B—Swards reading is an actual number. The larger the number, the harder the film.
C—In evaluation of chemical resistance, 100 indicates that the film is substantially unchanged over time period indicated, 0 indicates its complete failure.

Table 2 demonstrates that enamel finishes, the resin binders of which consist of the amino resin of the present invention, and a commercially available alkyd, are superior. It further demonstrates that when the resin binder consists of the aminoplast material of the present invention, said commercially available amino resin and the said alkyd, the finish is superior to one in which the binder is a mixture of said commercial amino resin and said alkyd. This improvement is obviously the result of the presence of the amino resin of the invention in the binder.

Conventional acid catalysts may be used with the resin of the present invention and in conventional amounts. A suitable catalyst is p-toluene sulfonic acid which has been used with success in conventional amounts such as between 0.25–1.50% of the total amino resin although smaller and larger amounts have been found to be satisfactory. Other suitable catalysts include oxalic, formic, phthalic, maleic, chlorofumaric, trichloroacetic, phosphoric, hydrochloric acid and the like.

In addition to being useful in surface coatings, the alkylated methylol melamines of the present invention are useful as cross-linking agents in molding, bonding, laminates and as a textile resin.

I claim:

1. A process comprising dissolving melamine in a substantially non-alcoholic aqueous solution of formaldehyde at a mol ratio of at least 6.5:1 formaldehyde to melamine, respectively, at a pH between 7 and 11 and correspondingly at a temperature between about 75° C. and 35° C. with constant stirring until the solution clears, while adjusting the water content to a minimum of 60% by weight of the total charge, maintaining the pH between 7 and 11 and correspondingly maintaining the temperature between 75° C. and 35° C. while stirring the reaction mixture, while the reaction continues, with movement through the reaction medium in an otherwise unagitated dispersion, raising the pH to between 8 and 11 upon exotherm subsidence, in order to inhibit temperature decline, until the reaction product has substantially completely precipitated out of solution and separating the solids from the supernatant liquid.

2. A process comprising dissolving melamine in a substantially non-alcoholic aqueous solution of formaldehyde at a mol ratio of at least 6.5:1 formaldehyde to melamine, respectively, at a pH between 7 and 11 and correspondingly at a temperature between 75° C. and 35° C. with constant stirring until the solution clears, while adjusting the water content to a minimum of 60% by weight of the total charge, maintaining the pH between 7 and 11 and correspondingly maintaining the temperature between 75° C. and 35° C. while stirring the reaction mixture, while the reaction continues, with movement through the reaction medium in an otherwise unagitated dispersion, raising the pH to between 8 and 11 upon exotherm subsidence, in order to inhibit temperature decline, until the reaction product has substantially completely precipitated out of solution and separating the solids from the supernatant liquid, adding a monohydric aliphatic alcohol containing 1 to 4 carbon atoms to the precipitated solids in an amount sufficient to provide at least 8 mols of alcohol per mol of melamine, adjusting the temperature to 20° C.–75° C. and the pH to 1–3 while agitating constantly until all of the solids have dissolved, neutralizing the charge and dehydrating the product by removing at least 80% of the free water, adding more of said alcohol in an amount sufficient to provide at least 3 mols of free alcohol per mol of melamine, adjusting the pH to 1–3 and the temperature to 20° C.–75° C. with constant stirring until reaction is substantially completed, neutralizing the charge and removing substantially all free water.

3. A process comprising dissolving melamine in a substantially non-alcoholic aqueous solution of formaldehyde at a mol ratio of at least 6.5:1 formaldehyde to melamine, respectively, at a pH between 7.0 and 11.0 and correspondingly at a temperature between 75° C. and 35° C. with constant stirring until the solution clears, while adjusting the water content to a minimum of 60% by weight of the total charge, maintaining the pH between 7 and 11 and correspondingly maintaining the temperature between 75° C. and 35° C. while stirring the reaction mixture, while the reaction continues, with movement through the reaction medium in an otherwise unagitated dispersion, raising the pH to between 8 and 11 upon exotherm subsidence, in order to inhibit temperature decline, until the reaction product has substantially completely precipitated out of solution and filtering the solids from the supernatant liquid, adding methanol to the precipitated solids in an amount sufficient to provide at least 8 mols of methanol per mol of melamine, adjusting the temperature to 20° C.–75° C. and the pH to 1–3 while stirring constantly until all of the solids have dissolved, neutralizing the charge and dehydrating the product by removing at least 80% of the free water, adding more of said methanol in an amount sufficient to provide at least 3 mols of free methanol per mol of melamine, adjusting the pH to 1–3 and the temperature to 20° C.–75° C. with constant stirring until reaction is substantially completed, neutralizing the charge and removing substantially all free water.

4. A process comprising dissolving melamine in a substantially non-alcoholic aqueous solution of formaldehyde at a mol ratio of at least 6.5:1 formaldehyde to melamine, respectively, at a pH between 7 and 11 and correspondingly at a temperature between 75° C. and 35° C. with constant stirring until the solution clears, while adjusting the water content to a minimum of 60% by weight of the total charge, maintaining the pH between 7 and 11 and correspondingly maintaining the temperature between 75° C. and 35° C. while stirring the reaction mixture, while the reaction continues, with movement through the reaction medium in an otherwise unagitated dispersion, raising the pH to between 8 and 11 upon exotherm subsidence, in order to inhibit temperature decline, until the reaction product has substantially completely precipitated out of solution and filtering the solids from the supernatant liquid, adding butanol to the precipitated solids in an amount sufficient to provide at least 8 mols of butanol per mol of melamine, adjusting the temperature to 20° C.–75° C. and the pH to 1–3 while stirring constantly until all of the solids have dissolved, neutralizing the charge and dehydrating the product by removing at least 80% of the free water, adding more of said butanol in an amount sufficient to provide at least 3 mols of free butanol per mol of melamine, adjusting the pH to 1–3 and the temperature to 20° C.–75° C. with constant stirring until reaction is substantially completed, neutralizing the charge and removing substantially all free water.

5. A process comprising dissolving melamine in a substantially non-alcoholic aqueous solution of formaldehyde at a mol ratio of at least 6.5:1 formaldehyde to melamine, respectively, at a pH between 7 and 11 and correspondingly at a temperature between 75° C. and 45° C. with constant stirring until the solution clears, while adjusting the water content to a minimum of 60% by weight of the total charge, maintaining the pH between 7 and 11 and correspondingly maintaining the temperature between 75° C. and 35° C. while stirring the reaction mixture, while the reaction continues, with movement through the reaction medium in an otherwise unagitated dispersion, raising the pH to between 8 and 11 upon exotherm subsidence, in order to inhibit temperature decline, until the reaction product has substantially completely precipitated out of solution and filtering the solids from the supernatant liquid, adding ethanol to the precipitated solids in an amount sufficient to provide at least 8 mols of ethanol per mol of melamine, adjusting the temperature to 20° C.–75° C. and the pH to 1–3 while stirring constantly until all of the solids have dissolved, neutralizing the charge and dehydrating the product by removing at least 80% of the free water, adding more of said ethanol in an amount sufficient to provide at least 3 mols of free ethanol per mol of melamine, adjusting the pH to 1–3 and the temperature to 20° C.–75° C. with constant stirring until reaction is substantially completed, neutralizing the charge and removing substantially all free water.

References Cited in the file of this patent
UNITED STATES PATENTS

| | | |
|---|---|---|
| 2,197,357 | Widmer et al. | Apr. 16, 1940 |
| 2,529,856 | West et al. | Nov. 14, 1950 |
| 2,645,625 | Bonzagni | July 14, 1953 |
| 2,684,347 | Nickerson | July 20, 1954 |
| 2,781,332 | Swann et al. | Feb. 12, 1957 |
| 2,918,452 | Kun et al. | Dec. 22, 1959 |

OTHER REFERENCES

Webster's New International Dictionary, 2nd Ed. (1956), Merriam Co., Publishers, Springfield, Mass., p. 50 (agitate).

Perry: Chem. Eng. Handbook, 3rd Ed. (1950), p. 1193–1203, McGraw-Hill.

Weissberger: Tech. of Organic Chem., vol. III, part I, Separation and Purification, p. 419–21, 431–3, 521–6, Interscience 1956.

UNITED STATES PATENT OFFICE

CERTIFICATE OF CORRECTION

Patent No. 2,998,411                          August 29, 1961

Richard N. Housekeeper

It is hereby certified that error appears in the above numbered patent requiring correction and that the said Letters Patent should read as corrected below.

Column 3, line 15, after "sphere" insert -- until --.

Signed and sealed this 15th day of May 1962.

(SEAL)
Attest:

ERNEST W. SWIDER                          DAVID L. LADD
Attesting Officer                            Commissioner of Patents